United States Patent Office 2,999,452
Patented Sept. 12, 1961

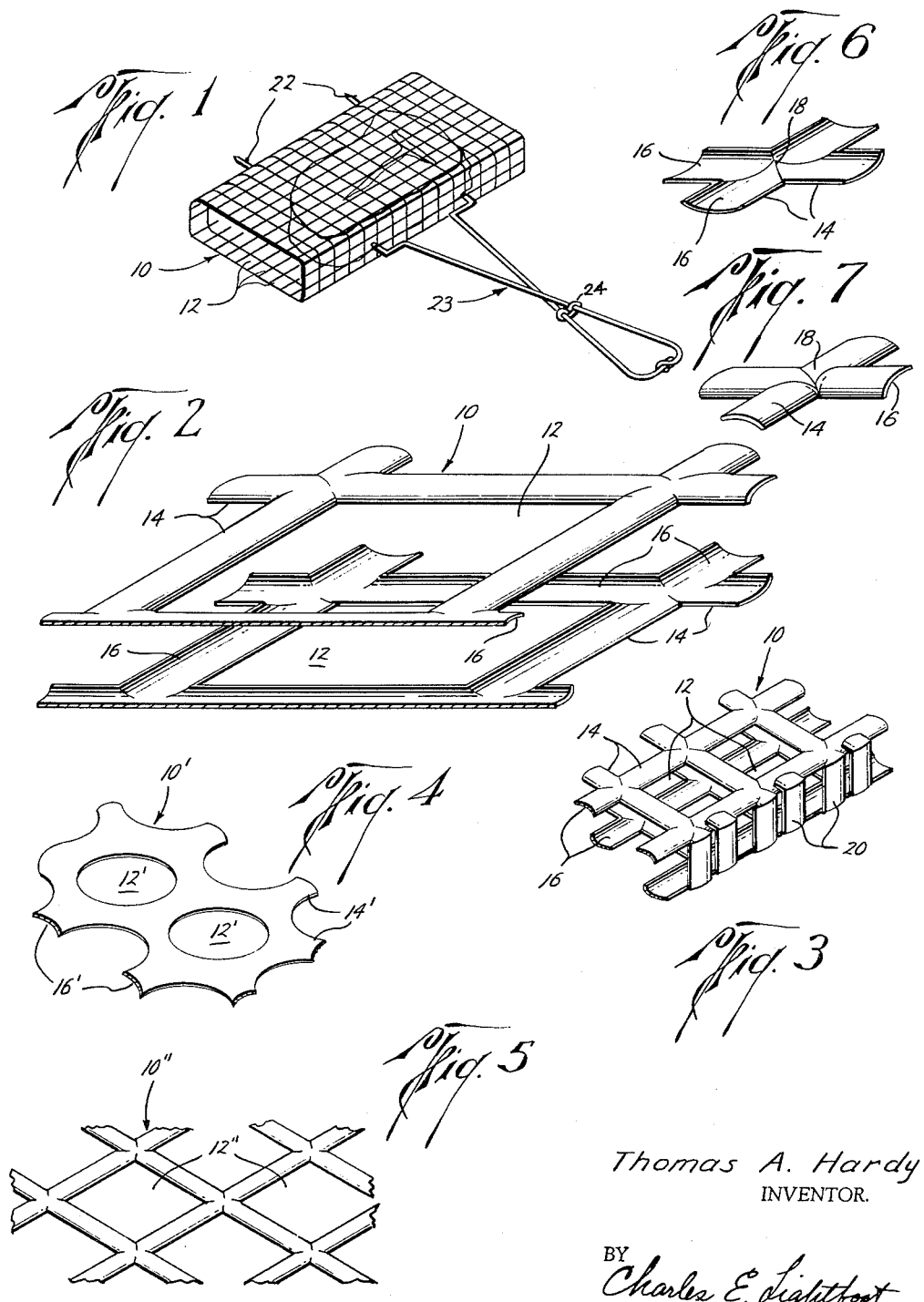

2,999,452
DISPOSABLE WRAPPER FOR COOKING FOOD
Thomas A. Hardy, 3205 Tampa St., Houston, Tex.
Filed Sept. 29, 1958, Ser. No. 764,117
2 Claims. (Cl. 99—402)

This invention relates to food cooking equipment and more particularly to disposable means in the form of a grill-like wrapper upon which articles of food may be supported or in which such articles may be enclosed to hold the food over a fire to cook the same.

In the broiling of food it has been proposed heretofore to wrap the food in an enclosing wrapper, such as aluminum foil, for the purpose of retaining the moisture and juices in the food and preventing the drying out of the same. By this method of cooking various flavoring substances, such as sauces, spices, and the like may also be held in close contact with the food to additionally flavor the same and prevent the loss of such flavoring which takes place when the food is cooked by direct exposure to the fire.

The use of this method for retaining the natural juices and flavoring of the food possesses the disadvantage, however, that the desirable flavoring of the food by smoke as well as the browning of the food which takes place when the food is exposed directly to the fire is prevented.

The present invention has for an important object the provision of a grill-like wrapper for use in conjunction with other supporting means to hold articles of food over a fire to cook the food and expose the same to the effect of smoke, whereby the flavor of the food and the browning of the same is greatly enhanced without undue drying out of the food.

Another object of the invention is to provide means for wrapping food to be cooked to hold the food against breaking, crumbling or disintegration when the same is heated and at the same time permit the exposure of the food to the flavoring effect of smoke while the same is being cooked.

A further object of the invention is the provision of a grill-like wrapper device for supporting food over a fire having means for retaining the natural juices of the food in contact with the food during the cooking of the same, whereby the food is prevented from drying out and is at the same time subjected to the browning effect of direct exposure to the fire and the flavoring effect of the smoke therefrom.

Another object of the invention is to provide a grill formed of relatively thin sheet metal, which is shaped to greatly increase the supporting strength, rigidity, and stiffness of the sheet.

A further object of the invention is the provision in a sheet metal food supporting grill-like wrapper of means for retaining liquids on such a wrapper and preventing the running off or draining away of juices from the food supported thereon to hold the juices in contact with the food during the cooking of the same.

A still further object of the invention is to provide a food supporting grill-like wrapper which is of simple design and economical manufacture whereby the same is rendered disposable to eliminate the necessity of washing or cleaning the same after use.

The above and other important objects and advantages of the invention may best be understood from the following detailed description, constituting a specification of the same, when considered in conjunction with the annexed drawings, wherein—

FIGURE 1 is a perspective view on a reduced scale illustrating the invention and showing one way in which the same is adapted to be used in the cooking of food;

FIGURE 2 is a fragmentary perspective view, illustrating a preferred embodiment of the invention and showing details of construction of the same;

FIGURE 3 is a fragmentary, perspective view showing one way in which the grill-like wrapper of the invention is adapted to be used;

FIGURE 4 is a fragmentary, perspective view illustrating a somewhat different form of the invention showing details of construction of the same;

FIGURE 5 is a fragmentary, top plan view illustrating a further modified form of the invention;

FIGURE 6 is a fragmentary, perspective view of a still further modification of the invention, and FIGURE 7 is a view similar to that of FIGURE 6, showing the reverse side of the modified form of the invention illustrated in FIGURE 6.

Referring now to the drawings in greater detail, the wrapper of the invention, generally designated 10 in FIGURES 1, 2 and 3 of the drawings, is preferably formed of thin sheet metal, such as sheet aluminum of light gauge having perforations or openings 12 therein of any desired or convenient shape and size which are preferably distributed uniformly throughout the area of the sheet. Between the openings 12 the sheet is formed with intervening, strip like portions 14 which may be flat, but which are preferably arcuate in cross-section to provide grooves or troughs 16 all of which are open at the same side of the sheet. The grooves or troughs 16 may also be formed in various cross-sectional shapes, other than that shown, such as V-shaped, and may extend continuously across the sheet from side to side and from end to end thereof.

As shown in FIGURES 6 and 7, the portions 14 at the locations where the grooves or troughs 16 intersect may be formed with portions 18 bent upwardly from the bottoms of the grooves or troughs to divide the troughs into short sections each of which may serve as a separate receptacle for liquid or the like when the wrapper is in use to prevent the running off or drawing away of such liquid from the food being cooked.

In making use of the wrapper constructed as described above, the food to be cooked may be placed on the wrapper with the troughs 16 opening upwardly beneath the food and the wrapper then supported over the fire as by placing the same on a grate or other suitable supporting structure. When used in this manner it will be apparent that the food will be directly exposed to the heat and smoke from the fire through the openings 12, while at the same time juices from the food or any flavoring substances such as sauces, or the like, may be retained in the grooves in intimate contact with the food during cooking of the same.

Should it be desired to cook articles of food having a tendency to break or crumble when cooked, such articles may be placed on the sheet and the sheet folded over the food to enclose the same and hold the food against crumbling or disintegrating while being cooked.

As best shown in FIGURE 3, the portions 14 may be extended beyond the openings 12 about the margins of the sheet to form tabs or extensions 20 which are adapted to be bent, in the manner shown in FIGURE 3 when the food has been wrapped between folds of the sheet, to hold the folds together in enclosing relation to the food.

The grill of the invention may also be used by wrapping the food in the sheet, as shown in FIGURE 1 and supporting the grill on a suitable implement or holder, such as the tong-like implement 23, having prongs 22 adapted to be inserted through the openings or mesh of the wrapper and whose distance apart may be adjusted as desired by means of the sliding clip 24. When supported in this manner the wrapper may be held over the fire and turned or rotated without danger of dislodging the food.

The wrapper of the invention may also be used in the cooking of food in conventional receptacles, such as pots or frying pans, to hold the food out of contact with the bottom of such a receptacle. Thus, for example, in frying bacon the strips of bacon may be placed on the wrapper positioned in a frying pan whereby grease from the bacon may drain off into the bottom of the pan, leaving the bacon in a crisp condition. By folding the sheet over the strips of bacon to be broiled in an oven the strips may be held flat and prevented from curling up when cooked.

In cooking food by the use of the invention constructed as illustrated in FIGURE 6 the juices from the food or any flavoring materials such as sauces, or the like, may be retained in the separate sections or receptacle portions of the troughs and held in contact with the food during the cooking of the same.

A somewhat modified form of the invention is illustrated in FIGURE 4, wherein the grill 10' is formed with circular openings 12' with intervening portions 14' which are arcuate in cross-section to provide troughs or grooves 16'. This form of the invention is otherwise similar to the forms previously described and is used in the same manner.

It will, of course, be evident that the openings of the wrapper of the invention may be of any desired shape.

The invention may conveniently be made by punching the holes 12 in sheet material by any convenient means and the intervening portions 14 may be shaped by any suitable mechanism, such as rollers between which the sheet may be passed to form the troughs or corrugations 16.

The wrapper of the invention may also be economically produced in the same manner as the expanded metal mesh commonly called expanded metal lath, produced by forming slits in the sheet material in parallel relation and pulling or stretching the sheet in a direction substantially normal to the lengths of the slits to form a grill having diamond shaped openings 12" and intervening portions 14" as illustrated in FIGURE 5.

The stiffness and rigidity of the wrapper may, of course, be increased by using sheet metal of increased thickness, or, when desired the wrapper may be made of metal foil when it is to be used as a wrapper to hold food which is to be supported by other means than the wrapper itself.

It will thus be seen that the invention constructed and used as described above, provides a device which may be used as a support or wrapper for food to be cooked, and which functions to hold the food to permit the same to be easily turned over and to prevent sticking of the food to a supporting surface while at the same time permitting the food to be browned and flavored by exposure to the direct heat and smoke of the fire.

The invention has been disclosed herein in connection with certain specific embodiments of the same, but it will be understood that these are intended by way of illustration only, and that the device is capable of modification in various respects within the spirit of the invention and the scope of the appended claims.

Having thus clearly shown and described the invention, what is claimed as new and desired to secure by Letters Patent is:

1. A wrapper for use in cooking food comprising a thin foldable sheet of metal having openings therethrough distributed substantially uniformly throughout the area of the sheet and formed with intersecting strip-like portions extending continuously across the sheet between the openings and having portions of trough shape in cross-section whose opposite ends are closed adjacent the intersections of the strip-like portions.

2. A wrapper for use in cooking food comprising a thin, foldable sheet of metal having openings therethrough distributed uniformly throughout the area of the sheet and formed with intersecting strip-like portions extending between the openings said strip-like portions being bent to form trough shaped portions closed at the intersections of the strip-like portions and open on the same side of the sheet.

References Cited in the file of this patent
UNITED STATES PATENTS

| | | |
|---|---|---|
| 195,995 | Edwards | Oct. 9, 1877 |
| 676,479 | Wagner | June 18, 1901 |
| 798,805 | Kurlfinke | Sept. 5, 1905 |
| 850,654 | Jones | Apr. 16, 1907 |
| 1,792,078 | Davis | Feb. 10, 1931 |
| 2,226,155 | Bjornson | Dec. 24, 1940 |
| 2,742,850 | La Fond | Apr. 24, 1956 |
| 2,875,683 | Burns | Mar. 3, 1959 |

OTHER REFERENCES

New Products Digest, page 34, February 1956, published Austin, Texas, Box 2246.